Patented Oct. 16, 1951

2,571,954

UNITED STATES PATENT OFFICE 2,571,954

TRIS-PHENYL ETHYLENE COMPOUNDS

Robert S. Shelton, Mariemont, and Marcus G. Van Campen, Jr., Wyoming, Ohio, assignors to The Wm. S. Merrell Company, Cincinnati, Ohio, a corporation of Delaware No Drawing. Application October 25, 1947, Serial No. 782,232

7 Claims. (Cl. 260—613)

This invention relates to new compounds which have value as estrogenic agents and which combine low toxicity with high therapeutic activity. The new compounds are indicated for the treatment of atrophic rhinitis, amenorrhoea, atrophic vulvovaginitis, inhibition of lactation, and in the treatment of the menopause. This application is a continuation-in-part of our application Ser. No. 384,584, filed March 21, 1941.

The new compounds include tris-p-hydroxyphenyl ethylene and certain derivatives thereof which may be represented by the structural formula:

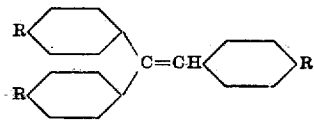

in which each R is a radical selected from the group consisting of hydroxy, alkoxy, acyl-oxy, and benzoyl-oxy at least one of which is hydroxyl. The alkoxy derivatives include those in which the alkyl radicals of the ether groupings are aliphatic residues of low molecular weight. The acyl-oxy derivatives are those in which the acyl radicals are residues of low molecular weight aliphatic acids. In the new compounds the R-substituents need not be the same, but one or more may be different so that mixed compounds result; e. g. compounds containing one or more hydroxy groups with the remainder ether or ester groups, or compounds containing one or more ether groups with the remainder ester groups. Those compounds in which R represents hydroxy or alkoxy are particularly advantageous for therapeutic use although the esters have the advantage of prolonged activity as compared to the other compounds.

In general, these compounds are well defined crystalline materials, quite soluble in oil and practically insoluble in water. The compounds in which R is hydroxy are soluble in aqueous alkali.

As pointed out above the new compounds are highly active therapeutically. They possess the advantage of an extremely small threshold esterogenic activity combined with low toxicity.

The new compounds may be prepared from simpler structures by various addition and condensation reactions. For example, the tris-p-alkoxy derivatives are conveniently prepared by the reaction of 4,4'-di-alkoxybenzophenone with an alkoxybenzyl magnesium halide as a Grignard reagent. The resulting ethanol is dehydrated to the ethylene compound. Also an appropriate desoxy-alkoxybenzoin may be reacted with a desired alkoxyphenylmagnesium halide, according to the Grignard procedure, followed by dehydration of the resulting alcohol.

Tris-p-hydroxyphenyl ethylene may be produced from the tris-methoxy compound through de-etherification by means of strong alkali hydrolysis. Mixed compounds containing both hydroxy and ether groupings may be produced in a step-wise reaction including the addition of a 4,4'-di-oxy derivative of benzophenone and a Grignard reagent prepared from the oxy derivative of an aralkyl halide, followed by dehydration of the resulting alcohol to the ethylene compound. The oxy-substituted groups are selected with a view to selective cleavage to the desired mixed hydroxy-ether derivatives. For example, in the presence of methylmagnesium iodide in ether solution the aralkoxy groups are cleaved while the alkoxy groups remain untouched. The ester derivatives may be prepared by conventional methods, e. g., the reaction of the hydroxy compounds with controlled amounts of acid anhydrides or acid chlorides. The benzoyl compounds are formed by the reaction of the benzoyl halide upon the hydroxy derivative. The new compounds are purified by conventional extraction, distillation and recrystallization methods.

Preparation of exemplary individuals of the new compounds will be illustrated in the following examples, but the invention is not limited thereto:

EXAMPLE I

*1,1-bis-p-hydroxyphenyl-2-(p-anisyl)-ethylene*

4,4'-dibenzyloxybenzophenone is prepared by the reaction of 4,4'-dihydroxybenzophenone and benzyl chloride in the presence of potassium hydroxide. It separates from benzene in colorless plates, M. P. 184–185° C. 700 parts of an 0.36 N solution of p-methoxybenzylmagnesium chloride is slowly added to a well stirred refluxing solution of the 4,4'-dibenzyloxybenzophenone in 1260 parts of anhydrous benzene. Refluxing is continued for 2 hours after the addition has been completed. The mixture is decomposed with 1200 parts of 5% ammonium chloride solution. After the aqueous layer has been separated the residue is made alkaline with ammonia and concentrated to 800 parts on a steam bath. Chilling gives approximately 86 parts of 1,1-bis(p-benzyloxyphenyl)-2-(p-anisyl) ethanol in the form of colorless needles, M. P. 120–123° C.

A suspension of 97 parts of this ethanol in 525 parts of 85% phosphoric acid is stirred for 4 hours on a steam bath. Dilution with an equal volume of water causes a gummy solid to separate. Recrystallization from acetone gives approximately 77 parts of colorless needles, M. P. 80–82° C.

To a suspension of 5 parts of the resulting ethylene in 160 parts of ether is added 15 parts of a 2.5 N solution of methylmagnesium iodide. The ether is removed by distillation and the residue is heated for 5 hours on the steam bath. The frothy solid is decomposed with excess dilute ammonium chloride solution before the organic material is extracted with ether. Phenolic material is extracted from the ether with dilute sodium hydroxide solution. The addition of excess carbon dioxide (Dry Ice) to the alkaline solution causes the solution to separate. Recrystallization from benzene gives colorless needles of 1,1-bis-p-hydroxyphenyl-2-(p-anisyl)-ethylene, M. P. 184–185° C.

EXAMPLE II

1,2-bis(p-hydroxypheneyl)-1-(p-anisyl)ethylene

This compound is prepared by the analogous reaction of 4-methoxy, 4'-benzyloxybenzophenone with benzyl chloride in the presence of potassium hydroxide. The resulting ketone is reacted with an excess of p-benzyloxybenzylmagnesium chloride solution to yield 1,2-bis(p-benzyloxyphenyl)-1-(p-anisyl) ethanol. This compound is dehydrated to the corresponding ethylene by stirring a suspension of it in 85% phosphoric acid at steam bath temperatures. The resulting 1,2-bis(p-benzyloxyphenyl)-1-(p-anisyl)ethylene is treated by heating with an excess of methylmagnesium iodide solution at steam bath temperatures to yield the final product.

EXAMPLE III

1,1,2-tris(p-acetoxyphenyl)ethylene

A solution of 24 parts of p-anisoyl anisole in 40 parts of hot benzene is poured with stirring into 160 parts of cold absolute ether. To the resulting suspension of finely divided anisoyl anisole is added 22 parts of p-methoxy benzyl magnesium chloride in about 250 parts of ether. The latter reagent is added with stirring over a period of about one hour, after which the reaction mixture is poured into 150 parts of water containing 37 parts of ammonium chloride and 5 parts of 28% aqueous ammonia. The upper ether layer is separated and evaporated on the steam cone. The residue is recrystallized from hot alcohol containing a little ammonia. Tris-p-methoxyphenyl ethanol is obtained in about 75–85% yield, M. P. 130–131° C. The ethanol compound is placed in a Claisen flask with a few crystals of sulfamic acid or toluene sulfonic acid and slowly warmed under a pressure of 10 to 20 mm. until effervescence ceases. The residual oil is then poured into 150 to 300 parts of ligroin and warmed until it dissolves. This solution is then treated with decolorizing carbon, and is allowed to stand for several days. Tris-p-methoxyphenyl ethylene separates in white clusters of needle-like crystals, M. P. 100–101° C. The yield is about 85%.

A suspension of 34.7 parts of tris(p-methoxyphenyl) ethylene and 100 parts of potassium hydroxide in 400 parts of ethanol is shaken in an autoclave at 200° C. for 24 hours. The material is diluted with 1000 parts of water before the ethanol is distilled off on a steam bath. The resulting aqueous solution is chilled, acidified with concentrated hydrochloric acid and extracted with ether. The ether extract is washed, dried and concentrated on a steam bath. Esterification of the residual oil is accomplished by refluxing for 4 hours with a mixture of 98 parts of pyridine and 108 parts of acetic anhydride. The reaction mixture is poured into 2000 parts of water and the oil is extracted with chloroform. The chloroform solution is washed with dilute sodium hydroxide and water, dried and concentrated on a steam bath. Recrystallization of the residue from a mixture of benzene and petroleum ether gives 20 parts of 1,1,2-tris(p-acetoxyphenyl) ethylene in the form of colorless needles, M. P. 135–137° C.

EXAMPLE IV

1,1,2-tris(p-hydroxyphenyl)ethylene

A suspension of 8.6 parts of tris(p-acetoxyphenyl)ethylene in 200 parts of 10% potassium hydroxide solution is refluxed for 5 hours. Acidification with acetic acid gives an oil which gradually solidifies. Recrystallization from xylene gives about 4.3 parts of pale yellow needles, melting at 189 to 191° C. when thoroughly dry.

EXAMPLE V

1,1-di-p-anisyl-2-(p-hydroxyphenyl)ethylene p-Benzyloxybenzyl alcohol is prepared by treating p-hydroxybenzyl alcohol with benzyl chloride in the presence of potassium hydroxide. It separates from ligroin in colorless plates, M. P. 87–88° C. A suspension of 64 parts of p-benzyloxybenzyl alcohol in 600 parts of ether is saturated with dry hydrogen chloride at a temperature below 10° C. The solution is left for 12 hours at 50° C. before the solvent is evaporated upon a steam bath. Recrystallization of the residue from ligroin gives 63 parts of p-benzyloxyphenyl chloride as colorless plates, M. P. 76–78° C.

The Grignard reagent is prepared from 11.6 parts of p-benzyloxybenzyl chloride and 7.2 parts of magnesium in 200 parts of ether and is added dropwise, with stirring to a refluxing solution of 10.5 parts of 4,4'-dimethoxybenzophenone in 90 parts of benzene for 2 hours and refluxed. The mixture is decomposed with excess ammonium chloride solution. The organic layer is separated, made alkaline with ammonia and concentrated to 100 parts on a steam bath. Chilling gives approximately 11 parts of crystals of 1,1-di-p-anisyl-2-(p-benzyloxyphenyl) ethanol, M. P. 120–124° C. After recrystallization from ethanol the material melted at 123 to 125° C. The suspension of 9 parts of this ethanol in 170 parts of 85% phosphoric acid is stirred for 4 hours on the steam bath. The suspension is diluted with water and filtered. Recrystallization of the solid from ethanol gives 7.8 parts of colorless needles, M. P. 139–141° C. A solution of 6 parts of the resulting 1,1-di-p-anisyl-2-(p-benzyloxyphenyl) ethylene and 30 parts of concentrated hydrochloric acid in 200 parts of glacial acetic acid is heated on a steam bath for 2 hours. The solvents are removed by distillation under reduced pressure. An ethereal solution of the residue is washed with sodium bicarbonate solution, dried and evaporated on a steam bath. The resulting oil is soluble in ether, alcohol and benzene. Upon further purification crystalline 1,1-di-(p-anisyl)-2-(p-hydroxyphenyl)ethylene results.

We claim:
1. Compounds of the formula:

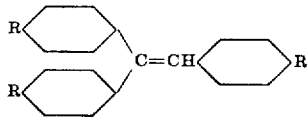

in which each R is a radical selected from the group consisting of hydroxy, lower alkoxy, lower aliphatic carboxy, and benzoyl-oxy, with the proviso that at least one of the radicals R is hydroxyl.

2. Tris-p-hydroxyphenyl ethylene.
3. Compounds of the class consisting of the mono lower alkyl and the di lower alkyl ethers of tris-p-hydroxyphenylethylene.
4. 1,1-bis-p-hydroxyphenyl-2-p-lower alkoxyphenyl-ethylene.
5. 1,1-di-p-lower alkoxyphenyl - 2 - hydroxyphenyl ethylene.
6. 1,1 - bis-p-hydroxyphenyl-2-p-anisyl-ethylene.
7. 1,1-bis-p-anisyl - 2 - p-hydroxyphenyl ethylene.

ROBERT S. SHELTON.
MARCUS G. VAN CAMPEN, Jr.

REFERENCES CITED

The following references are of record in the file of this patent:

UNITED STATES PATENTS

| Number | Name | Date |
|---|---|---|
| 2,301,260 | Davies et al. | Nov. 10, 1942 |
| 2,346,049 | Rohrmann | Apr. 4, 1944 |
| 2,430,891 | Shelton et al. | Nov. 18, 1947 |

Certificate of Correction

Patent No. 2,571,954 October 16, 1951

ROBERT S. SHELTON ET AL.

It is hereby certified that error appears in the printed specification of the above numbered patent requiring correction as follows:

Column 6, line 1, for "2-hydroxy-" read *2-p-hydroxy-*; and that the said Letters Patent should be read as corrected above, so that the same may conform to the record of the case in the Patent Office.

Signed and sealed this 29th day of January, A. D. 1952.

[SEAL]

THOMAS F. MURPHY,
*Assistant Commissioner of Patents.*